April 26, 1960  S. V. SONMORE ET AL  2,933,874
FRONT CASTORED MOWER
Filed Dec. 17, 1956  2 Sheets-Sheet 1
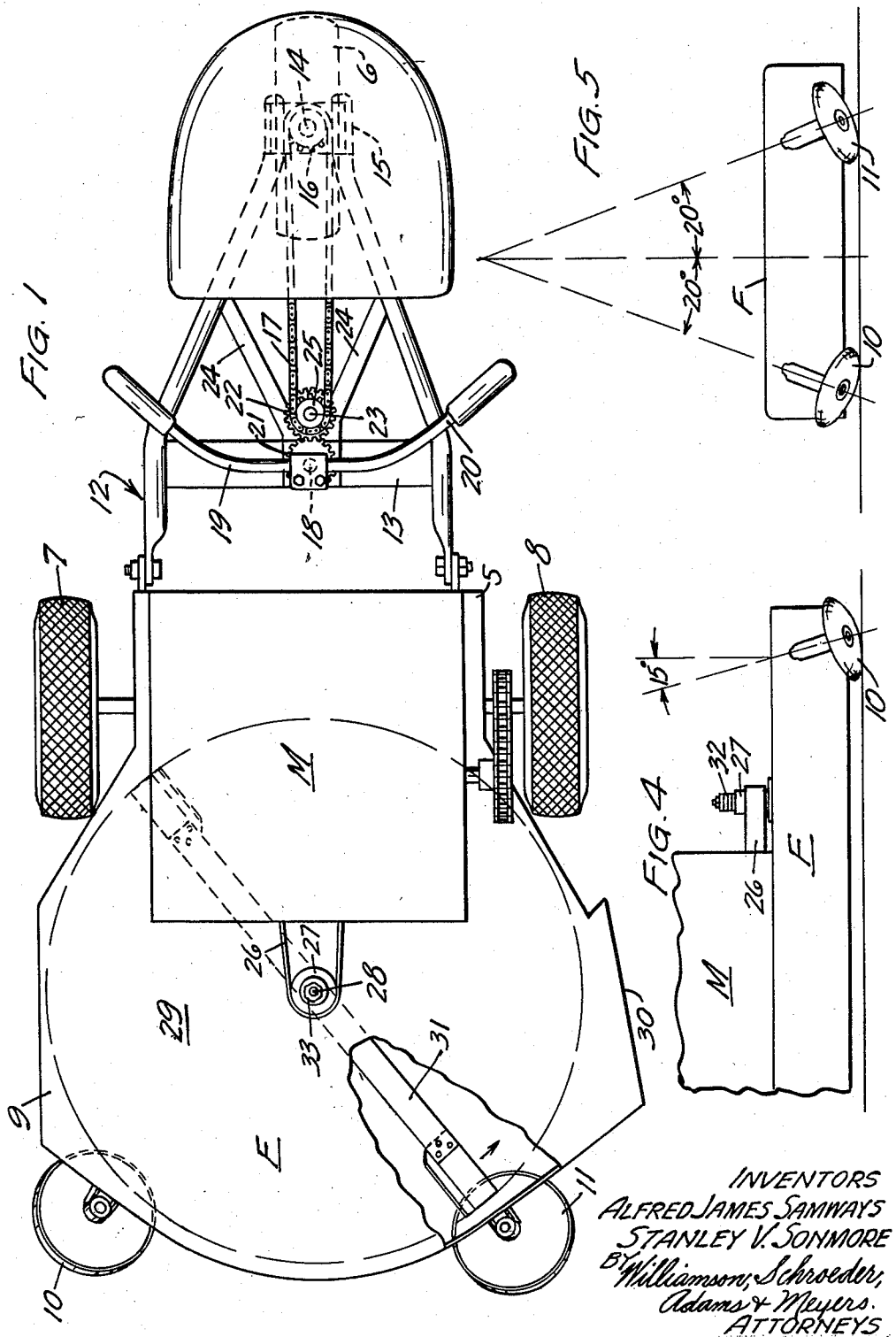
INVENTORS
ALFRED JAMES SAMWAYS
STANLEY V. SONMORE
BY Williamson, Schroeder,
Adams & Meyers.
ATTORNEYS April 26, 1960
S. V. SONMORE ET AL
2,933,874
FRONT CASTORED MOWER
Filed Dec. 17, 1956
2 Sheets-Sheet 2
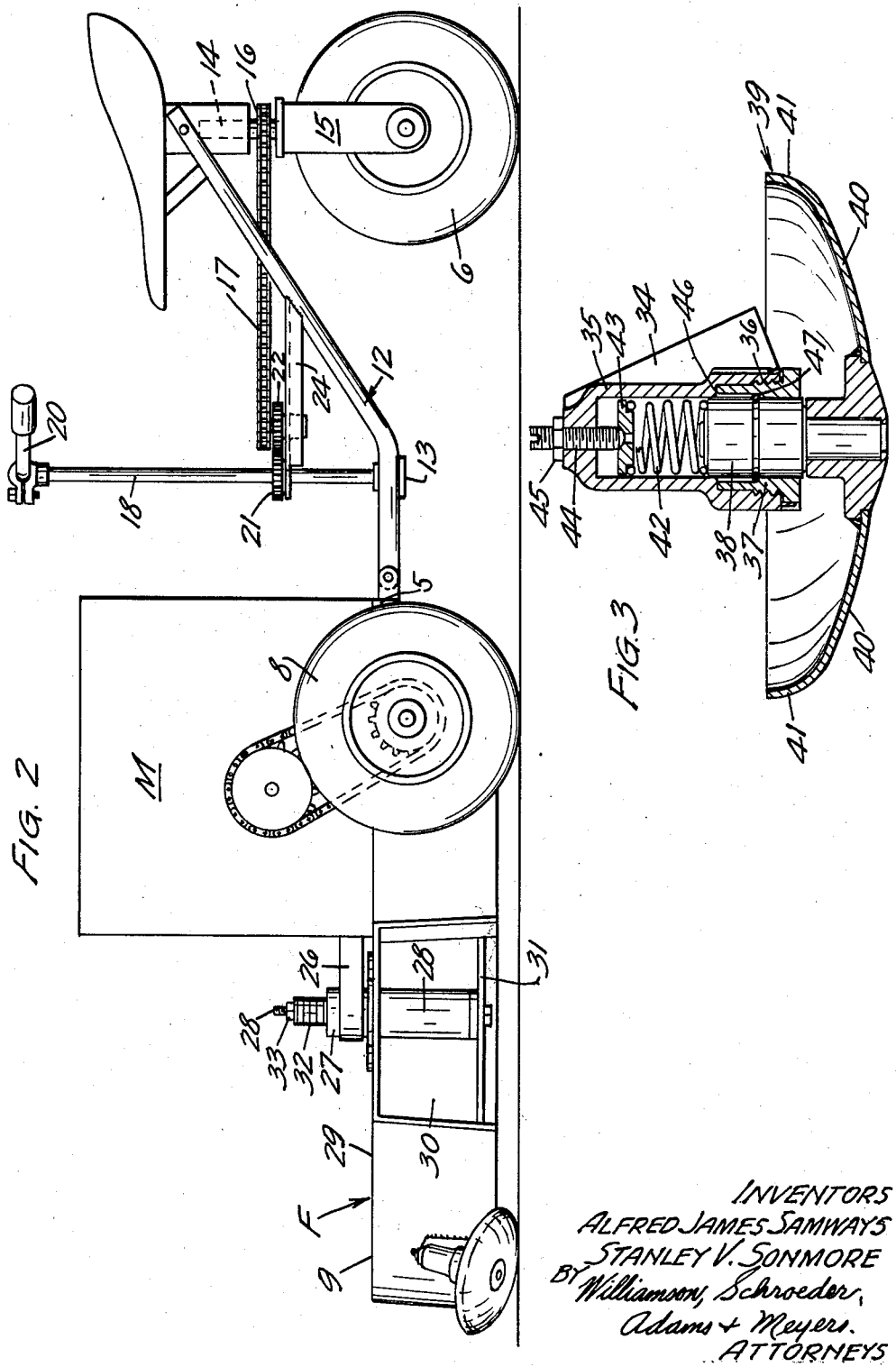
INVENTORS
ALFRED JAMES SAMWAYS
STANLEY V. SONMORE
BY Williamson, Schroeder,
Adams + Meyers.
ATTORNEYS

2,933,874

Patented Apr. 26, 1960

2,933,874

FRONT CASTORED MOWER

Stanley V. Sonmore and Alfred James Samways, Minneapolis, Minn., assignors to Toro Manufacturing Corporation, Minneapolis, Minn., a corporation of Minnesota Application December 17, 1956, Serial No. 628,591

12 Claims. (Cl. 56—25.4)

This invention relates to ground traversing machines. More particularly, it relates to rotary mowers of the sulky type wherein front castored wheels are necessary to effect adequate steering.

Mowing machines of the sulky type are generally quite heavy and as a result these machines are quite difficult to steer and have a distinct tendency toward leaving visible streaking effects on the lawn and sometimes permanent damage to the lawn when it is in a particularly soft condition. Lawn mowers of the sulky type, conventionally are provide with castored wheels at the front in order to permit proper steering. These castored wheels, however, are secured in such a manner and are so constructed and arranged that they have a very distinct tendency toward scuffing of the surface during turning operations and, because of the relatively long wheel base provided by them, the mower has a distinct scalping tendency. These machines are characterized by the difficulty which is experienced in steering them, especially on slopes or under such conditions that the weight of the machine tends to shift toward one of the castored wheels with the result that during turning operations and even when progressing in a straight line, there is a distinct tendency for the wheel bearing the greater weight to dig in and damage the lawn surface. My invention is designed to eliminate or reduce to a minimum these tendencies.

It is a general object of my invention to provide novel and improved means for supporting the forward end portion of a ground traversing machine.

A more specific object is to provide a novel and improved castored means at the forward portion of a relatively heavy machine to facilitate steering thereof.

Another object is to provide novel and improved means for supporting the forward portion of a heavy machine of the sulky type to facilitate steering of the same on slopes.

Another object is to provide novel and improved means for supporting the forward portion of a heavy grass mowing machine of the sulky type, in order to minimize the adverse effects normally resulting from the heavy weight imposed upon the ground engaging weight supporting members at the front of the machine.

Another object is to provide novel and improved means for supporting the forward portion of a relatively heavy rotary mower of the sulky type which will facilitate steering of the same on slopes.

Another object is to provide novel and improved means for supporting the forward portion of a heavy rotary mower of the sulky type which will facilitate steering of the same on all surfaces.

Another object is to provide novel and improved castored means for supporting the forward portion of a relatively heavy rotary mower which will minimize the adverse effects of the weight of the machine and avoid "streaking."

Another object is to provide a novel and improved ground engaging means for supporting the forward portion of a ground traversing machine which will minimize adverse effects upon the operation of the machine of small depressions and upwardly extending protuberances in the surface being traversed.

Another object is to provide novel and improved ground engaging means for supporting the forward portion of a mower which will minimize "scuffing" or tearing of the lawn which is being mowed.

Another object is to provide novel and improved ground engaging means for supporting the forward portion of a relatively heavy machine for use on relatively soft surfaces which will minimize the adverse effects of the weight of the machine upon such surface.

Another object is to provide a novel and improved ground engaging means for supporting the forward portion of a mower which effectively and substantially shorten the wheel base of the same and thereby minimize "scalping."

Another object is to provide a novel and improved ground engaging means for supporting the forward portions of a mower which is so constructed and arranged as to positively protect the cutter element and the housing of the mower from engaging the ground and thereby reduces "scalping" and "scuffing" tendencies and damage to the cutter element.

Another object is to provide novel and improved castored means for supporting the forward portion of a mower constructed and arranged to provide trimmability for the mower.

Another object is to provide novel and improved castored means for supporting the forward portion of a mower having an inherent spring loading feature which provides pronounced stabilization in steering and minimizes the tendency of the mower to jiggle, deflect and shift its weight as a result of the supporting means engaging small depressions in the surface being traversed.

Another object is to provide novel and improved castored means for supporting the forward portion of a mower which is constructed and arranged to eliminate variations in cuts at turns and to minimize scalping tendencies normally experienced with castor wheels upon adjustment of the height of the cut.

Another object is to provide novel and improved castored means for supporting the forward portion of the mower constructed and arranged to give the effect of a castored wheel of large diameter while keeping its structure in small compass.

Another object is to provide an improved rotary lawnmower having compactness and good side trimming and steering characteristics and yet keeping the scalping characteristics within reasonable limits.

Another object is to provide an improved rotary lawnmower constructed and arranged to negotiate severe ground undulations without "scalping."

These and other objects and advantages of my invention will more fully appear from the following description, made in connection with the accompanying drawings, wherein like reference characters refer to the same or similar parts throughout the several views, and in which:

Fig. 1 is a plan view of one embodiment of my invention;

Fig. 2 is a side elevational view of the same;

Fig. 3 is a vertical sectional view of one of the castored members supporting the forward end of the mower shown in Fig. 1 and Fig. 2;

Fig. 4 is a diagrammatic view illustrating the rearward tilt of the axis of rotation of the supporting member at the forward end of the machine;

Fig. 5 is a diagrammatic view illustrating the inward tilt of the axis of the supporting members which support the weight of the forward end of the machine.

One embodiment of my invention may be included in a ground traversing machine such as is shown in Figs. 1 and 2. As shown, this machine includes a frame indicated generally as F, the rearward portions 5 of which are supported by a rear steering wheel 6 and a pair of intermediate wheels 7 and 8. The wheels 7 and 8 engage the ground and support the rearward portions 5 of the frame while the forward portions 9 of the frame are supported by a pair of ground engaging support members indicated generally as 10 and 11. As shown, these support members 10 and 11 are spaced transversely of the machine and are rotatably mounted on the forward end portions 9 thereof. It is these rotatably mounted support members 10 and 11, constructed and arranged as shown, alone and in combination with the remainder of the structure shown, which constitutes my invention.

The frame F includes an A-shaped structure indicated generally as 12, which has a cross plate 13 extending between the legs thereof. The legs of the frame 12 meet toward the rear. Rotatably mounted between the rear end portions of these legs, is a shaft 14 which extends vertically and carries a bifurcated member 15 at its lower end which in turn rotatably supports or mounts the wheel 6. Secured and keyed to the shaft 14 is a sprocket wheel 16 which is driven by a chain drive 17.

Mounted on the cross plate 13 and extending upwardly therefrom, is a steering shaft 18. This steering shaft is rotatably mounted on the plate 13 and is adapted to be turned through the use of the handle bars 19 and 20. Mounted on the shaft 18 and secured thereto for rotation therewith about the vertical axis of the shaft 18, is a gear member 21 which intermeshes with a gear 22 which is carried on a countershaft 23 which in turn is rotatably mounted on a bar 24. The shaft 23 also carries a sprocket 25 around which the chain drive 17 passes so that as a result of turning of the shaft 18, through the use of the handle bars 19 and 20, the gears 21 and 22 will cooperate to turn the shaft 23, and as a result, the chain drive 17 will cause the rear wheel 6 to be turned accordingly.

Mounted on the frame F and illustrated only diagrammatically, is a motor and gear reducer indicated generally as M. The motor M is connected by a drive belt 26 which extends forwardly and passes around a pulley 27 to drive the same. The pulley 27 is mounted on a vertical shaft 28 which in turn is rotatably mounted upon a housing 29 which as best shown in Fig. 2, has an open bottom and has a discharge outlet 30 at one of its sides. Mounted upon the lower end of shaft 28 is a cutter element or blade 31 which is secured to the shaft and rotates therewith to effect the cutting of the grass. The height of the cut can be adjusted by repositioning the washers or sleeves 32, which as shown in Fig. 2 are above the pulley 27 and are secured to the shaft by a nut 33. The elevation of the cutter element 31 can be adjusted by removing or adding an extra sleeve or washer 32 as desired. The pulley 27, of course, is drivably connected to the shaft 28 so that it will drive the cutter element 31 at relatively high speed within the housing 29 at an elevation slightly above the lower edge of the latter, as best shown in Fig. 2.

The two rotatable support members 10 and 11 are constructed identically and therefore, for the sake of simplification, the parts of one of the two will be described with the understanding that the other is similar in construction. Each of the support members 10 and 11 is provided with a mounting bracket such as 34 which is secured to the vertical walls of the housing 29. Secured to each of these mounting brackets 34 is an inverted cup shape member 35, the structure of which can be best be seen by reference to Fig. 3. This cup shape member is threaded internally at its lower end as at 36 to adapt the same to threadedly receive therein a bearing member 37. This bearing member 37, as best shown in Fig. 3, is externally threaded to engage the threads of the cup shape member 35 to rotatably mount therein a shaft 38. This shaft 38 is movable vertically in the bearing member 37, as can best be seen in Fig. 3. Secured to the lower end of the shaft 38 is a disc member, indicated generally by the numeral 39. This disc or saucer shaped member 39 has a relatively flat radius throughout most of its exterior surface as at 40, while the more peripheral portions thereof have a sharper radius as at 41. The relatively flat radius is quite important in attaining some of the advantages of my invention, as will be described in greater detail hereinafter, and as shown, is 8¼ inches.

Mounted within the cup shaped member 35 is a spring member 42. This spring member 42 bears against the upper end of the shaft 38 and constantly urges it downwardly to the lower limits of its limited movement as is shown in Fig. 3. The upper end of the spring 42 is provided with a pressure plate 43 which is urged downwardly constantly by a pressure screw 44 which as shown in Fig. 3, is threaded into the upper end of the inverted cup shaped member 35. A lock nut 45 is provided for the pressure screw 44 to hold the same in the desired position. By varying the depth of the pressure screw 44, the amount of pressure which is applied to the spring 42 by way of the pressure plate 43 can be varied. It will be noted that the movement of the shaft 38 vertically has both upper and lower limits which are provided by a shoulder 46 in the cup shaped member and a second shoulder 47 in the bearing member 37.

Each of the rotatably mounted support members 10 and 11 are uniquely arranged so as to provide the advantages and obtain the objectives defined herein. The unique mounting or arrangement of these two support members can best be understood by reference to Fig. 4 and Fig. 5. Reference to Fig. 4 shows that each of these support members 10 and 11 are mounted in such a way on the outer surface of the housing 29, that the axis of rotation thereof extends rearwardly approximately 15° from vertical. Reference to Fig. 5 will show that each of the support members 10 and 11 are mounted so that their axis of rotation extends inwardly about 20° from vertical. Thus these two support members are mounted so that their axis of rotation extend upwardly and rearwardly and inwardly toward each other.

Each of the support mmebers 10 and 11 are mounted for free rotation and they rotate only because they engage the ground and support the forward portions of the housing 29 and the frame F. It will be noted that because of their unique arrangement there will be a very slight amount of skidding which takes place when the machine moves directly forward in a straight line. However, the amount of skid which takes place is negligible and in general, the disc shaped members 39 rotate so as to facilitate steering of the machine. The revolution of the disc shaped members 39 is the primary movement and gives the effects and advantages of a roving wheel. The effect of skidding on the turfs is negligible. The slight skidding referred to is the result of the inclination of the axis of the disc toward the center of the cutting unit.

In use, the weight of the machine is borne at the forward end thereof by the relatively broad, flat surfaces as at 40. This is the result of the inward and rearward tilting of the axis of the support members 10 and 11. The generous radius at 40 on each of these members, provides a broad weight bearing surface which minimizes the damage to soft supporting surfaces such as a moist or relatively soft lawn. As a result of this broad weight bearing surface, the adverse effect of the weight of a heavy machine, such as a sulky type mower upon such a soft surface is minimized.

A further advantage of this broad weight bearing surface 40 in contrast to the weight bearing surface provided by a conventional castored wheel is that the tendency toward "streaking" is eliminated. With such a heavy machine, the conventional castored wheel presses the grass downwardly and flattens it to such an extent that the grass does not raise sufficiently before the cutter unit goes over it to do a proper job of cutting. As a result, after the grass has been cut, there will frequently be streaks across the cut surface which indicates where the conventional castor wheels have passed. By utilizing the broad weight bearing surfaces 40, the weight is distributed over a wider area with the result that the grass springs up more quickly after the support members 10 and 11 have passed thereover, with the net result that a much improved cutting result is obtained.

The broad flat weight bearing surfaces 40 have additional advantages when the machine is used on a slope. When a heavy machine, such as a sulky type mower is utilized on a slope, the weight always shifts to the lower side. If the conventional castored wheel is utilized, at the forward part of the machine, there is a distinct tendency because of this shifting of weight for the wheel to dig in and scuff or tear up the surface. This tendency is eliminated in the use of the support members 10 and 11, for the broad flat surface 40 spreads the weight over a wider area and is disposed substantially parallel to the surface because of the inward tilt of the axis of the support members. In addition to eliminating the digging and the tearing of the lawn surface, these support members also minimize the adverse effect of weight shifting downhill on the slope for its weight is distributed over a relatively broad area.

When a sulky type lawn mower of the type shown, is provided with the rotatable support members 10 and 11, the result is that the tendency toward scuffing is minimized. This is especially true while negotiating turns and while cutting on a slope. "Scuffing" is a term utilized to describe the tendency for the wheel to slide over a lawn surface and severely damage the same without necessarily tearing the sod. It is the result of a member, such as a wheel, sliding sideways instead of moving forwardly in its normal line of motion.

The broad flat surfaces 40 provide other advantages in that they minimize the adverse effects of small depressions in the surface being traversed. For example, a small depression may readily pass beneath the broad, relatively flat surface 40 without any indication thereof being seen in the tilt or movement of the machine. This is in sharp contrast to what would be experienced if a castored wheel of the conventional type were utilized. As a result, the distinct scalping tendency which results from a conventional castored wheel when it enters such a depression is eliminated for the machine is supported at the same level even though such a depression is passed over.

It should also be noted that through the use of the relatively broad flat surfaces 40 and the angle of inclination of the axis of the support members 10 and 11, the adverse effect of weight shifting to the outside during turning has been minimized. In turning a machine provided with conventional castored wheels, the weight of the machine which always shifts to the outside during a turn, causes such wheels to dig in and damage the surface. Despite the shifting of weight in the use of my machine, the broad flat surfaces 40 preclude and substantially eliminate the adverse effects normally associated therewith.

It will be noted by reference to Fig. 1 that the support members 10 and 11 are secured to the housing 29 in such a manner that a substantial portion of the disc shaped members extends beneath the housing 29 and also within the orbit of the cutter element 31. This arrangement is important for it provides a substantially shorter wheel base for the machine. Reference to Fig. 1 shows that it is possible to support the forward end of such a machine with the support members 10 and 11 without materially adding to the wheel base of the machine. Anything which tends to shorten the wheel base of such a machine, tends to reduce the tendency toward "scalping." By positioning the disc shaped members 39 as shown in Fig. 1, I have reduced the wheel base of such a machine to a minimum, and thus there is a substantially less tendency toward "scalping" when using my machine.

It will also be noted that the disc shaped members 39 are so mounted that the outer periphery thereof extends outwardly only slightly farther than the more lateral portions of the housing 29 at the right hand side of the machine. This positioning of the saucer shaped member 39 adapts the machine to be used for trimming purposes for the outer periphery of the saucer shaped member may be utilized as a guide when the machine is used to trim along a wall or the like. When a relatively heavy machine such as a sulky type rotary mower as is shown in Figs. 1 and 2, is utilized on a side hill, the downward shifting of the weight of such a machine, makes steering thereof difficult. I have been able to successfully counteract this tendency by mounting the support members 10 and 11 so that the axis of rotation of the disc like members 39 extend inwardly. As a result of this orientation of the axis of rotation of the saucer shaped members 39, there is a distinct tendency for the members 39 to turn inwardly and as a result, this angle of the wheel or saucer shaped members 39, counteracts the downward shifting of the weight of the machine. In other words, the angulation of the axis of rotation of the saucer shaped members 39 provides a distinct tendency for the machine to crawl upwardly relative to the slope, with the result that the adverse effects normally experienced by the downward shifting of weight on a side hill is counteracted and steering becomes a relatively easy matter despite the fact that the machine is being used on a sharp slope.

The saucer shaped members act to facilitate steering in a similar manner while a turn is being negotiated. The outward shifting of weight of the machine on such a turn, makes it difficult normally to turn the machine, but here again the angle of the axis of rotation of the saucer shaped members 39 is such that the member 39 tends to turn the machine in the direction that the operator is attempting to turn the machine. Thus, the weight always shifts to the outside. In my machine it shifts upon the saucer shaped member which tends to turn the machine in the desired direction and the weight is shifted off the other saucer shaped member 39 which would tend to turn the machine in the opposite direction. In other words, the shifting of the weight is utilized to benefit the operator by aiding him in turning the machine.

It will be noted that I have shortened the wheel base of my machine more than the radius of the conventional castored wheel which is utilized at the front of such a machine conventionally. Because of the shortened wheel base, my machine can be steered more easily, for it is well known and recognized that the shorter the wheel base of a machine the more easily it may be turned, everything else being equal.

The positioning and mounting of the saucer shaped members 39 so that they pass beneath the lower peripheral edge of the housing 29 and also below the cutter element 31 provides a number of distinct advantages. The tendency toward "scalping" by both the blade and the lower edge of the housing 29, is substantially reduced and practically eliminated because of the shortened wheel base which as previously explained, tends to eliminate "scalping." Also the disc shaped member 39 acts as a guard for the blade and since it extends beneath the housing, it also acts as a positive guard member to preclude the housing digging into the sodded surface when sharp undulations in the terrain are encountered.

The spring loading of the saucer shaped members 39 is also important for it eliminates the shifting of weight of the machine and jiggling and deflections thereof which are normally caused by the encountering of small depressions with the conventional wheels. When such a small depression is encountered, by the saucer shaped members 39, there is no adverse effect and no tendency for the weight of the machine to shift and no jiggling or deflections of the machine, for the relatively broad surfaces 40 easily pass thereover with no adverse effect upon the machine. If the depression is sufficiently large so that the saucer shaped member extends downwardly into it, the spring loading takes up the vertical space provided by the depression, for the shaft 38 moves downwardly and again there is no shifting of weight, jiggling or deflection. In other words, the spring members 42 compensate for variations in the contour of the terrain. As a result, there is a pronounced stabilizing effect upon steering and there is no tilting or jiggling of the machine caused by such depressions.

Another advantage of my machine is that the variations in cut and the tendency to scalp on turns has been substantially eliminated. If conventional castored wheels are utilized, the variation in cut is provided substantially by adjustment of these castored wheels. This means that the machine rotates about the axis of the rear supporting wheels and as a result, while negotiating a turn there is frequently experienced a sharp variation in the height of the cut. These variations in cuts at the turn are not experienced with my machine.

The relatively sharp radius at the more peripheral portions as at 41, on the disc shaped members 39, brings the leading edge of the disc upward to act as a skid or deflector in case relatively large objects are encountered and facilitates climbing over such obstacles.

From the above, it can be seen that the use of the saucer shaped members 39, constructed and arranged as shown and described, provide a machine which gives equal maneuverability as compared to a machine having a supporting front wheel of relatively large diameter and yet provides many advantages which can not be obtained with a wheel of such relatively large diameter. These support members 10 and 11 enable the mower to negotiate severe ground undulations without scalping and other related adverse effects. In other words, it gives the effect of a large diameter wheel but with less compass. The rotation of these disc members 39, involves approximately one part skid and four parts turning so that the effect and advantages of a rolling wheel are obtained and the effect of the skidding is negligible. The compactness of my machine gives a mower with good side trimming characteristics and yet keeps the scalping characteristics within reasonable limits.

It will be noted that the discs 39 are spring loaded with a spring of sufficient strength so that when the load of the machine is divided equally between the two discs 39, they do not compress if in operation a small bump is encountered by one of the discs. In that event, more load is applied to the disc encountering the bump, and it moves in an upward direction by compressing the spring. Thus, the use of the springs produce a pronounced stabilizing effect in steering whether a bump or a depression is encountered.

It will, of course, be understood that various changes may be made in the form, details, arrangement and proportions of the parts without departing from the scope of my invention which consists of the matter shown and described herein and set forth in the appended claims.

What we claim is:

1. In a lawn mower, a housing having an open bottom and depending wall structure and having forward and rearward portions, ground-engaging support structure connected to said housing and supporting said rearward portions, a rotatable cutter element mounted for rotation within said housing and rotating in close proximity to its depending wall structure, and saucer-shaped rotatable support members mounted for rotation at laterally spaced points on said housing and depending therefrom and supporting the forward portions thereof, said members having slightly convex ground-engaging surfaces, the axes of rotation of said members being stationary and extending upwardly and inwardly relative to said housing.

2. The structure defined in claim 1 wherein said members extend beneath the confines of said housing and beneath and within the arc of rotation of said cutter element to minimize scalping.

3. The structure defined in claim 1 wherein the axes of said members are immediately outside and forward of said housing.

4. In a lawn mower, a frame having forward and rearward portions and laterally spaced sides, ground-engaging support structure connected to said frame and supporting said rearward portions, a rotatable cutter element mounted for rotation on said frame for grass-cutting action between said laterally spaced sides, and rotatable support members mounted for rotation on said frame adjacent opposite sides thereof and depending therefrom and supporting the forward portions thereof, said members having convex ground-engaging surfaces, the axes of rotation of said members being stationary and extending upwardly and inwardly relative to said frame.

5. The structure defined in claim 4, wherein said axes also extend upwardly and rearwardly.

6. A mobile supporting structure for a lawn mower or the like having rear ground-engaging support means and forward ground-engaging support means, said forward ground-engaging means comprising substantially saucer-shaped rotatable support members mounted for rotation at laterally spaced points on said structure and depending therefrom and supporting the forward portions thereof, said members having slightly convex ground-engaging surfaces, the axes of rotation of said members being stationary and extending upwardly and inwardly relative to said housing.

7. The structure as defined in claim 6, wherein the axes of rotation of said support members extend about 20 degrees inwardly from vertical.

8. The structure defined in claim 6, wherein the axes of rotation of said support members also extend rearwardly about 15 degrees from vertical.

9. A mobile supporting structure for a lawn mower or the like having rear ground-engaging support means and forward ground-engaging support means, said forward ground-engaging means comprising substantially saucer-shaped rotatable support members mounted for rotation at laterally spaced points on said structure and depending therefrom and supporting the forward portions thereof, said members having slightly convex ground-engaging surfaces, the axes of rotation of said members being stationary and extending upwardly and inwardly relative to said housing, said rear ground-engaging support means comprising a pair of wheels mounted for rotation about a fixed axis extending transversely of said structure.

10. A mobile supporting structure for a lawn mower or the like having rear ground-engaging support means and forward ground-engaging support means, said forward ground-engaging means comprising rotatable support members having substantially convex ground-engaging surfaces and being mounted for rotation at laterally spaced points on said structure and depending therefrom and supporting the forward portions thereof, the axes of rotation of said members being stationary and extending upwardly and inwardly relative to said housing.

11. The structure defined in claim 10 wherein the axes of rotation of said support members also extend upwardly and rearwardly.

12. A mobile supporting structure for a lawn mower or the like having rear ground-engaging support means and forward ground-engaging support means, said forward ground-engaging means comprising rotatable support members mounted for rotation at laterally spaced points on said structure and depending therefrom and supporting the forward portions thereof, said members having convex ground-engaging surfaces, the axes of rotation of said members being stationary and extending upwardly and inwardly relative to said housing, said rear ground-engaging support means comprising a pair of wheels mounted for rotation about a fixed axis extending transversely of said structure.

References Cited in the file of this patent

UNITED STATES PATENTS

| | | |
|---|---|---|
| 1,975,661 | Powell | Oct. 2, 1934 |
| 2,096,239 | Geyer | Oct. 19, 1937 |
| 2,176,551 | Solem | Oct. 17, 1939 |
| 2,332,089 | Knight | Oct. 19, 1943 |
| 2,347,524 | Swan | Apr. 25, 1944 |
| 2,489,730 | Soenksen | Nov. 29, 1949 |
| 2,620,612 | De Eugenio | Dec. 9, 1952 |
| 2,710,758 | Stettner | June 14, 1955 |

FOREIGN PATENTS

| | | |
|---|---|---|
| 239,701 | Great Britain | Sept. 17, 1925 |
| 759,608 | Great Britain | Oct. 14, 1956 |